(12) United States Patent
Jee

(10) Patent No.: US 6,602,140 B2
(45) Date of Patent: Aug. 5, 2003

(54) APPARATUS FOR DAMPING TORSIONAL VIBRATIONS

(75) Inventor: Tae-Han Jee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/126,421

(22) Filed: Apr. 18, 2002

(65) Prior Publication Data

US 2002/0189569 A1 Dec. 19, 2002

(30) Foreign Application Priority Data

Jun. 15, 2001 (KR) .................................. 2001-0033827

(51) Int. Cl.[7] ................................................. F16D 3/14
(52) U.S. Cl. ........................... 464/68; 74/574; 192/212; 123/192.1
(58) Field of Search ........................... 123/192.1, 192.2; 74/572, 573 R, 574; 464/68, 66; 192/201, 205, 212

(56) References Cited

U.S. PATENT DOCUMENTS 5,875,752 A * 3/1999 Zhao et al. .............. 123/192.1
6,287,205 B1 * 9/2001 Bonfilio et al. ............... 464/68

* cited by examiner

Primary Examiner—Tony M. Argenbright
Assistant Examiner—Katrina B. Harris
(74) Attorney, Agent, or Firm—Pennie & Edmonds LLP

(57) ABSTRACT

A dual mass flywheel between the output element of the engine and the power train of a motor vehicle is provided, which includes: a primary mass adapted to be attached to a crankshaft of an engine for rotation, the primary mass including two sheet metal components defining a damping chamber; a secondary mass supported for rotation relative to the primary mass and adapted to be coupled to a friction clutch; and a drive plate that is coupled to the secondary mass. A vibration damper is installed between the primary and secondary masses, the vibration damper including a plurality of ball members which move along the damping chamber by centrifugal force; a plurality of ball guide members; a plurality of resilient members; and a drive guide.

7 Claims, 3 Drawing Sheets

APPARATUS FOR DAMPING TORSIONAL VIBRATIONS

FIELD OF THE INVENTION

The present invention relates to a flywheel of a vehicle for use in a power train assembly, and more particularly, to a dual-mass flywheel that provides damping effects under various vibration conditions.

BACKGROUND OF THE INVENTION

Generally, a flywheel is used to dampen torsional vibrations between an internal combustion engine and a power train. That is, the flywheel is an apparatus that acquires rotational force during a power stroke and decreases a rotational speed change by inertial force during other strokes. The flywheel is provided with a primary mass connectable to a secondary mass, the primary mass being non-rotatably affixed to an output element (such as a crankshaft) of an engine, and the secondary mass being connectable to an input shaft of a transmission in response to engagement of a friction clutch. The primary mass and the secondary mass can rotate relative to each other in a predetermined range, and therefore even though torsional vibrations occur because of a sudden engine torque change, a sudden change in rotational speed can be prevented so that the torsional vibrations do not transmit to other components of the vehicle.

In the above-stated flywheel, the secondary mass performs as a dynamic damper such that torsional vibrations of a drive system can be decreased. The secondary mass is connected to the primary mass through a spring.

As shown in FIG. 1a, a conventional flywheel includes a primary mass 110 and a secondary mass (not shown) that is rotatable relative to the primary mass 110. The secondary mass is rotatably connected to the primary mass 110 through an arc-shaped spring 120 that is fixed to the primary mass 110.

If the primary mass 110 rotates, the spring 120 pushes a drive plate (not shown) that is fixed to the secondary mass by riveting so that the secondary mass rotates. Then, a clutch that is fixed to the secondary mass starts to rotate.

FIG. 1b shows another conventional flywheel that comprises a spring 120' that is arranged in a radial direction of a primary mass 110'. If a drive plate (not shown) that is fixed to a secondary mass (not shown) rotates, the secondary mass causes tension force on the spring 120'.

FIG. 1c shows yet another conventional flywheel that comprises a primary mass 110". A plurality of linear springs 120" are circularly disposed in the primary mass 110".

However, the above-stated conventional flywheels can operate satisfactorily only under specific circumstances. Operation of these flywheels depends only on engine torque regardless of engine speed, and therefore it is difficult to obtain satisfactory damping effects under various vibration characteristics.

SUMMARY OF THE INVENTION

The present invention provides a dual mass flywheel in which damping force varies with change of engine speed such that satisfactory damping effects under various vibration conditions can be obtained.

In a preferred embodiment of the present invention, a primary mass is connected to an engine crankshaft. The primary mass includes a damping chamber extending along its circumferential direction. A secondary mass is supported for rotation relative to the primary mass and adapted to be coupled to a transmission input shaft. A drive plate is coupled to said secondary mass and a torsional vibration damping device yieldingly couples the secondary mass to the primary mass. Preferably, in the torsional vibration damping device, a plurality of ball members move along the damping chamber by centrifugal force. A plurality of ball guide members force the ball members to contact the primary mass. Each of the ball guide members are arranged to be rotatable with the drive plate. A plurality of resilient members support each of the ball members on both sides. A drive guide transmits rotational force of the drive plate to the resilient members and is arranged to rotate with the drive plate.

Preferably, the dual mass flywheel further comprises a plurality of joint guides being disposed between the ball members and the resilient members, with the joint guides having the resilient members forced along their longitudinal axes.

In another preferred embodiment of the present invention a primary mass adapted to be attached to a crankshaft for rotation. The primary mass has two sheet metal components defining a damping chamber extending along its circumferential direction. A secondary mass is connectable to a transmission input shaft, with the secondary mass being rotatable relative to the primary mass. A torsional vibration damping device yieldingly couples the secondary mass to the primary mass. In this embodiment, in the torsional vibration damping device, a plurality of resilient members are disposed in the damping chamber of the primary mass along its circumferential direction. A roller is disposed between the resilient members, the roller being arranged to be movable in a radial and a circumferential direction. A drive plate is fixedly coupled to the secondary mass, compressing the resilient members when there is a rotational deviation between the primary mass and the secondary mass.

Preferably, the dual mass flywheel further comprises a joint guide disposed between the roller and the resilient members so that a force compressing the resilient members acts along a longitudinal axis of the resilient members. A roller guide is also disposed between the roller and an inner wall of the damping chamber so as to guide movements of the roller. And a drive guide is disposed between the said resilient members and the drive plate.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1A:
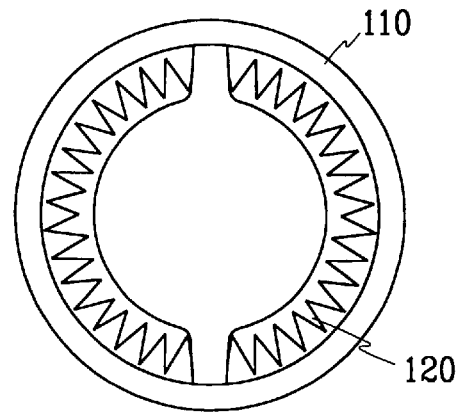
FIGS. 1a to 1c show flywheels according to a prior art.
Figure 1B:
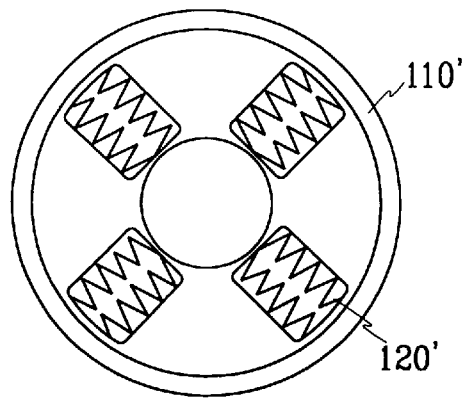
Figure 1C:
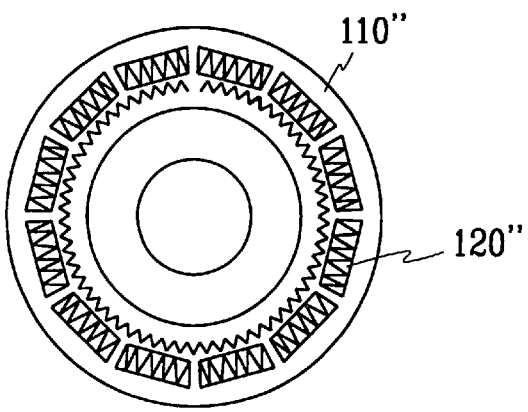
Figure 2:
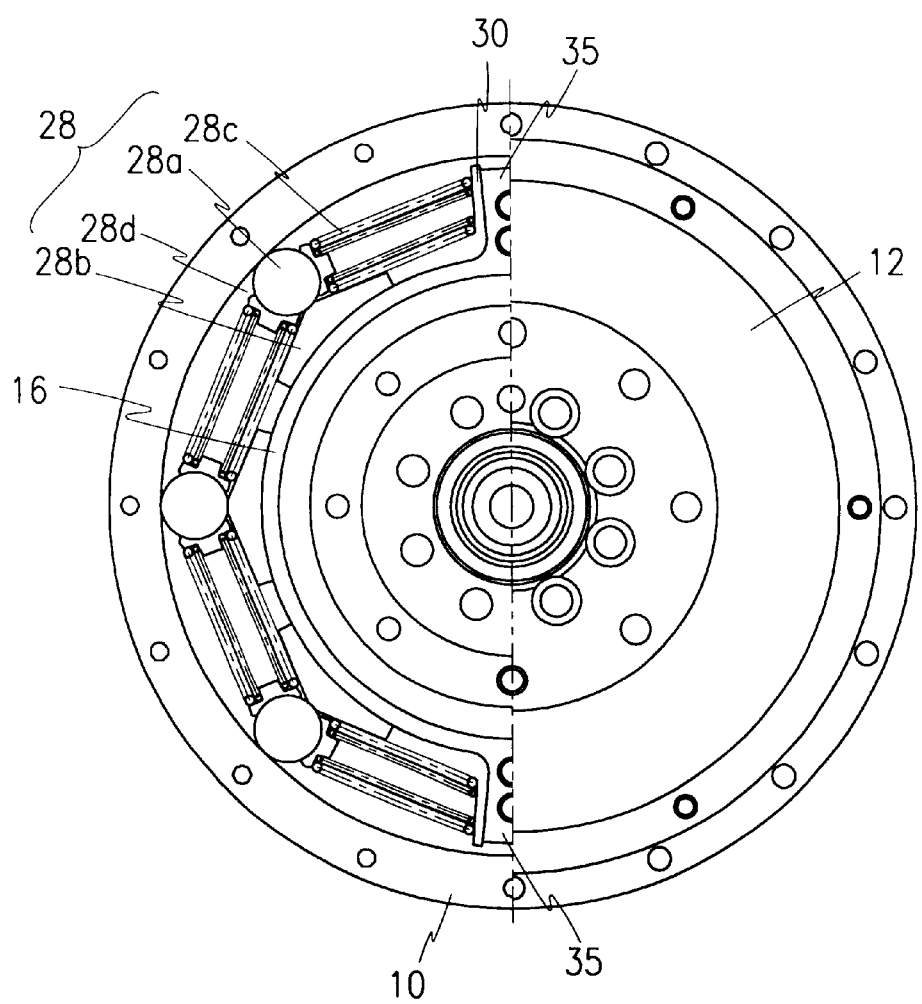
FIG. 2 is a front view of a flywheel according to a preferred embodiment of the present invention.
Figure 3:
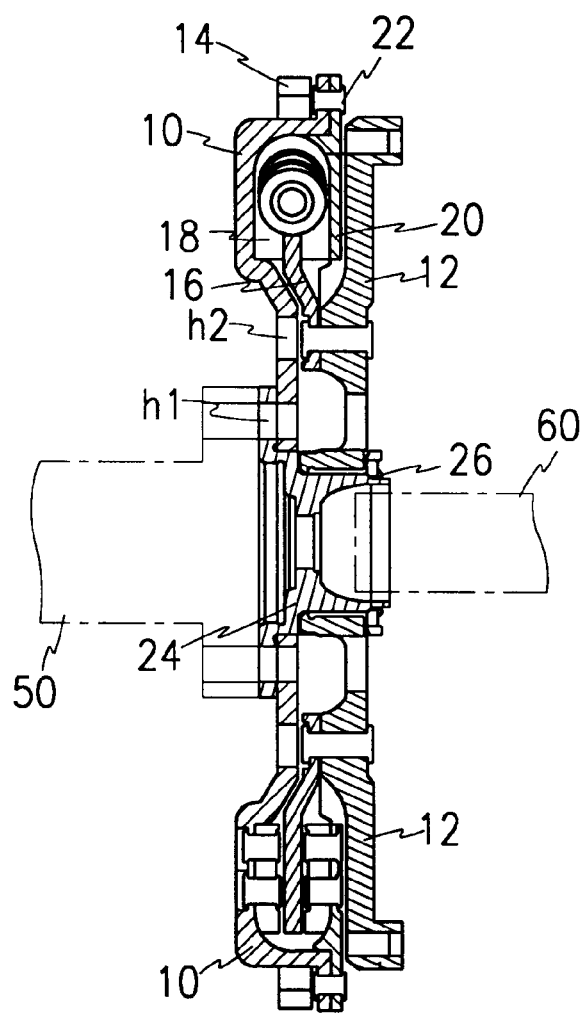
FIG. 3 is a sectional view of the flywheel of FIG. 2.

As shown in FIGS. 2 and 3, the flywheel according to the present invention comprises a primary mass 10 that is non-rotatably affixed to an output element 50 (such as a crankshaft) of an engine, and a secondary mass 12 being connectable to an input shaft 60 of a transmission in response to engagement of a friction clutch (not shown).

The secondary mass 12 is connected to the primary mass 10 through a bushing or a bearing such that the secondary mass 12 is rotatable relative to the primary mass 10.

A ring gear 14 is provided on an outer circumferential surface of the primary mass 10. A plurality of holes hi for connecting the primary mass 10 to the output element 50 of an engine are provided in the primary mass 10, and a plurality of holes h2 for connecting a drive plate 16 to the secondary mass 12 are provided in the primary mass 10.

A damping chamber 18 where a torsional vibration damper 28 is installed is provided in the primary mass 10 at a predetermined position.

A plurality of supporters 35 are provided in the damping chamber 18 along a circumferential direction at a predetermined distance. A cover 20 is secured to the primary mass 10, for example with rivets 22 or by welding. The cover 20 restricts movement of the torsional vibration damper 28 and seals lubricant oil that is contained in the damping chamber 18.

The supporters 35 are mounted to the primary mass 10, for example with bolts, rivets, or by welding.

A hub 24 is fixed to the primary mass 10 in a middle position thereof in an axial direction (for example with bolts or rivets), and the hub 24 is rotatably connected to a center hole of the secondary mass 12 with a bushing or a bearing.

A friction plate 26 is provided in an end portion of the hub 24, which regulates torque decrease between the primary mass 10 and the secondary mass 12 by friction force.

A friction surface that a friction clutch assembly contacts is provided in the secondary mass 12 so as to control power transmission, and the drive plate 16 is fixedly connected to the secondary mass 12, for example with rivets, bolts, or the like.

The drive plate 16 contacts the torsional vibration damper 28 at at least two points so that torque is transmitted to the secondary mass 12 through the torsional vibration damper in the damping chamber 18.

The torsional vibration damper 28 comprises a ball member 28*a*, a ball guide 28*b* that leads a movement of the ball member 28*a*, a spring 28*c* that provides a resilient force to the ball member 28*a*, and a joint guide 28*d* that is disposed between the ball member 28*a* and the spring 28*c*.

The ball guide 28*b* performs both a guide role to make the ball member 28*a* freely move in the damping chamber 18, and a restricting role to prevent the ball member 28*a* from contacting the drive plate 16 unnecessarily. Ball guide 28*b* is arranged in such a manner that it moves without deviating from the drive plate 16. The portion of the ball guide 28*b* that the ball member 28*a* contacts is geometrically designed to smoothly contact the ball member 28*a*.

The joint guide 28*d* makes it possible for the ball member 28*a* to rotate to a certain degree because of a relative movement of the primary and secondary masses 10 and 12, while the ball member 28*a* and the spring 28*c* are perpendicularly maintained. Therefore, the joint guide 28*d* forces the spring 28*c* in its longitudinal direction so that durability of the torsional vibration damper increases.

A lubricant can be used between the ball member 28*a* and the joint guide 28*d* for reducing frictional force therebetween.

Under this structure, the higher the rotational speed of the flywheel, the greater the centrifugal force acting on the ball member 28*a* becomes, so that friction between the ball member 28*a* and the primary mass 10 increases, and consequently an amount of energy needed for moving the ball member 28*a* increases. That is, because greater torque is needed to move the ball member 28*a* at a high engine speed, characteristics of the damper 28 vary with the engine speed.

The spring 28*c* transmits and stores the torque generated in the torsional vibration damper 28 as stated above, with the ball member 28*a* being disposed between the springs 28*c*, and the joint guide 28*d* being disposed between the ball member 28*a* and the spring 28*c*.

The spring 28*c* can be arranged to be linear or circular, and a plurality of springs can be used for increasing the intensity.

A drive guide 30 is disposed between the drive plate 16 and the spring 28*c*. The drive guide 30 performs torque transmission between the drive plate 16 of the secondary mass 12 and the spring 28*c* of the primary mass 10, and in addition, it guides the movement of the spring 28*c* such that the spring 28*c* does not deviate. For precise movement of the spring 28*c*, the drive guide 30 is coupled to the drive plate 16 in a concave-convex form.

If the engine torque becomes higher, the rotational force of the primary mass 10 increases so that the primary mass 10 rotates relative to the transmitting plate 16, and then the ball member 28*a* rolls along the outer portion of the damping chamber 18. The damper performs a damping function and simultaneously transmits the rotational force of the primary mass 10 to the transmitting plate 16, and thereby the secondary mass 12 that is fixedly connected to the transmitting plate 16 rotates.

The centrifugal force acting on the ball member 28*a* changes according to the engine speed, and therefore the force transmitted to the spring 28*c* changes. The operating torque is regulated according to the rotational speed of the flywheel.

As stated in the above, if the engine speed becomes higher, the torque needed for moving the ball member of the torsional vibration damper becomes higher. Thus, the flywheel according to the preferred embodiment of the present invention provides optimal damping characteristics for the specific engine speed.

Therefore, the dual mass flywheel according to the preferred embodiment of the present invention can more effectively reduce vibration noises of gears of the transmission.

What is claimed is:

1. A dual mass flywheel, comprising:
   a primary mass connected to an engine crankshaft, said primary mass defining a damping chamber extending along its circumferential direction;
   a secondary mass supported for rotation relative to said primary mass and adapted to be coupled to a transmission input shaft;
   a drive plate that is coupled to said secondary mass; and
   a torsional vibration damping device yieldingly coupling said secondary mass to said primary mass,
   wherein said torsional vibration damping device comprises:
   a plurality of ball members that move along said damping chamber by centrifugal force;
   a plurality of ball guide members that force said ball members to contact said primary mass, each of said ball guide members being arranged to be rotatable with said drive plate;
   a plurality of resilient members, each of said ball members being elastically supported by said resilient members on both sides; and a drive guide transmitting rotational force of said drive plate to said resilient members and being arranged to rotate with said drive plate.

2. The dual mass flywheel of claim 1, further comprising a plurality of joint guides being disposed between said ball member and said resilient members, said joint guides having said resilient members forced along their longitudinal axes.

3. The dual mass flywheel of claim 1, wherein said resilient members are coil springs.

4. A dual mass flywheel, comprising:

a primary mass adapted to be attached to a crankshaft for rotation, said primary mass having two sheet metal components defining a damping chamber extending along its circumferential direction;

a secondary mass connectable to a transmission input shaft, said secondary mass being rotatable relative to said primary mass; and a torsional vibration damping device yieldingly coupling said secondary mass to said primary mass, wherein said torsional vibration damping device comprises:

a plurality of resilient members disposed in said damping chamber of said primary mass along its circumferential direction;

a roller disposed between said resilient members, the roller being arranged to be movable in a radial and a circumferential direction; and a drive plate fixedly coupled to said secondary mass, said drive plate compressing said resilient members when there is a rotational deviation between said primary mass and said secondary mass.

5. The dual mass flywheel of claim 4, wherein said torsional vibration damping device further comprises a joint guide disposed between said roller and said resilient members so that a force compressing said resilient members acts along a longitudinal axis of said resilient members.

6. The dual mass flywheel of claim 4, wherein said torsional vibration damping device further comprises a roller guide disposed between said roller and an inner wall of said damping chamber so as to guide movements of said roller.

7. The dual mass flywheel of claim 4, wherein said torsional vibration damping device further comprises a drive guide disposed between said resilient members and said drive plate.

* * * * *